(12) United States Patent
Wang et al.

(10) Patent No.: US 11,936,059 B2
(45) Date of Patent: Mar. 19, 2024

(54) BATTERY FRAME, BATTERY GROUP, BATTERY PACK, AND METHOD FOR ASSEMBLING BATTERY GROUP

(71) Applicant: CONTEMPORARY AMPEREX TECHNOLOGY CO., LIMITED, Ningde (CN)

(72) Inventors: Yongguang Wang, Ningde (CN); Peng Wang, Ningde (CN); Shenglin Li, Ningde (CN); Kaijie You, Ningde (CN); Yu Tang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 238 days.

(21) Appl. No.: 17/552,343

(22) Filed: Dec. 15, 2021

(65) Prior Publication Data

US 2022/0149473 A1 May 12, 2022

Related U.S. Application Data

(63) Continuation of application No. PCT/CN2020/127371, filed on Nov. 7, 2020.

(30) Foreign Application Priority Data

Nov. 19, 2019 (CN) .......................... 201911134930.5

(51) Int. Cl.
*H01M 50/264* (2021.01)
*H01M 10/658* (2014.01)
(Continued)

(52) U.S. Cl.
CPC ....... *H01M 50/264* (2021.01); *H01M 10/658* (2015.04); *H01M 50/209* (2021.01); *H01M 50/503* (2021.01)

(58) Field of Classification Search
CPC ............ H01M 50/209; H01M 50/529; H01M 50/172; H01M 50/174; H01M 50/102; H01M 50/514
See application file for complete search history.

(56) References Cited

U.S. PATENT DOCUMENTS

| | | |
|---|---|---|
| 5,853,915 A | 12/1998 | Suto |
| 2013/0034763 A1 | 2/2013 | Byun |
| 2015/0380697 A1 | 12/2015 | Osborne et al. |

FOREIGN PATENT DOCUMENTS

| | | |
|---|---|---|
| CN | 101194381 A | 6/2008 |
| CN | 202096366 U | 1/2012 |

(Continued)

OTHER PUBLICATIONS

Japan Patent Office (JPO) The Notice of Reasons for Refusal for JP Application No. 2022-526275 dated Jun. 27, 2023 7 Pages (Translation Included).

(Continued)

*Primary Examiner* — Maria Laios
*Assistant Examiner* — Jordan E Berresford
(74) *Attorney, Agent, or Firm* — ANOVA LAW GROUP, PLLC

(57) ABSTRACT

Embodiments of this application provide a battery frame, a battery group, a battery pack, and a method for assembling a battery group. The battery frame according to the embodiments of this application includes at least two frames. The at least two frames are sequentially connected along a first direction. Among the at least two frames, any two adjacent frames are rotatably connected to each other, so that the battery frame is foldable. The foldability of the battery frame according to the embodiments of this application diversifies the battery frame effectively.

11 Claims, 14 Drawing Sheets

(51) Int. Cl.
H01M 50/209 (2021.01)
H01M 50/503 (2021.01)

(56) References Cited

FOREIGN PATENT DOCUMENTS

| | | | |
|---|---|---|---|
| CN | 103219479 A | | 7/2013 |
| CN | 103259036 A | | 8/2013 |
| CN | 204315650 U | | 5/2015 |
| CN | 204315650 U | * | 5/2015 |
| CN | 204441392 U | | 7/2015 |
| CN | 204732468 U | | 10/2015 |
| CN | 205582986 U | | 9/2016 |
| CN | 106450075 A | | 2/2017 |
| CN | 206422111 U | | 8/2017 |
| CN | 107732080 A | | 2/2018 |
| CN | 108292720 A | | 7/2018 |
| CN | 108418534 A | | 8/2018 |
| CN | 110112456 A | | 8/2019 |
| EP | 2463932 A1 | | 6/2012 |
| EP | 3444864 A1 | | 2/2019 |
| EP | 3739681 A1 | | 11/2020 |
| JP | S58119174 A | | 7/1983 |
| JP | H07183014 A | | 7/1995 |
| JP | 2005116407 A | | 4/2005 |
| JP | 2005116459 A | | 4/2005 |
| JP | 2008544441 A | | 12/2008 |
| JP | 2012198995 A | | 10/2012 |
| JP | 2013140707 A | | 7/2013 |
| JP | 2016537768 A | | 12/2016 |
| KR | 201440128845 A | | 11/2014 |
| WO | WO2007011144 A1 | | 1/2007 |
| WO | WO2016132280 A1 | | 8/2016 |

OTHER PUBLICATIONS

Contemporary Amperex Technology Co., Limited, Extended European Search Report, EP20890907.7, dated Sep. 28, 2022, 7 pgs.
The European Patent Office (EPO) The First Office Action for EP Application No. 20890907.7 dated Feb. 3, 2023 5 Pages.
The European Patent Office (EPO) Decision to Grant a patent for EP Application No. 20890907.7 dated May 31, 2023 8 Pages.
International Search Report and Written Opinion, PCT/CN2020/127371, dated Jan. 27, 2021, 11 pgs.
First Office Action, CN201911134930.5, dated Jun. 2, 2021, 19 pgs.
Ningder Age New Energy Technology Co. Ltd., Notification to Grant Paten Right for Invention, CN201911134930.5, dated Aug. 6, 2021, 7 pgs.

* cited by examiner

BATTERY FRAME, BATTERY GROUP, BATTERY PACK, AND METHOD FOR ASSEMBLING BATTERY GROUP

CROSS-REFERENCE TO RELATED APPLICATIONS

This application is a continuation application of PCT Patent Application No. PCT/CN2020/127371, entitled "BATTERY FRAME, BATTERY MODULE, BATTERY PACK AND METHOD FOR ASSEMBLING BATTERY MODULE" filed on Nov. 7, 2020, which claims priority to Chinese Patent Application No. 201911134930.5, filed with the State Intellectual Property Office of the People's Republic of China on Nov. 19, 2019, and entitled "BATTERY FRAME, BATTERY GROUP, BATTERY PACK, AND METHOD FOR ASSEMBLING BATTERY GROUP", all of which are incorporated herein by reference in their entirety.

TECHNICAL FIELD

This application relates to the technical field of batteries, and in particular, to a battery frame, a battery group, a battery pack, and a method for assembling a battery group.

BACKGROUND

In a battery group, a battery frame is configured to accommodate a battery module. In the related technologies, the battery frame is generally non-foldable, the form of the battery frame is monotone, and application of the battery frame is limited.

SUMMARY

A technical issue to be solved by this application is to diversify battery frames.

To fulfill the foregoing objective, this application provides a battery frame, including at least two frames. Each of the at least two frames includes a pallet and side plates. The side plates are peripherally connected to the pallet and include a first side plate and a second side plate that are arranged oppositely along a first direction. The first direction is parallel to a plane in which the pallet is located. The at least two frames are sequentially connected along the first direction. Among the at least two frames, any two adjacent frames are rotatably connected to each other, so that the battery frame is in either an unfolded state or a folded state. When the battery frame is in the unfolded state, the at least two frames are disposed alongside in the first direction. When the battery frame is in the folded state, the at least two frames are stacked along a second direction. The second direction is perpendicular to the plane in which the pallet is located.

In some embodiments, the battery frame includes at least three frames. Among any three adjacent frames, a middle frame is folded in an opposite direction against two frames located on two opposite sides of the middle frame.

In some embodiments, among any three adjacent frames, the middle frame is rotatably connected to a frame on a first side of the middle frame through a first rotation structure, the middle frame is rotatably connected to a frame on a second side of the middle frame through a second rotation structure, and the first rotation structure and the second rotation structure are located at two ends of the frame along the second direction, so that the middle frame is folded in an opposite direction against the two frames located on two opposite sides of the middle frame.

In some embodiments, the first rotation structure is located at an end of a side plate along the second direction, the end being away from the pallet. The second rotation structure is located at an end of a side plate along the second direction, the end being close to the pallet.

In some embodiments, the first rotation structure includes a first spindle, a first connecting slot, and two first connecting holes; the first spindle is disposed on the second side plate of the frame on the first side; the first connecting slot and the two first connecting holes are all disposed on the first side plate of the middle frame; the two first connecting holes are located at two ends of the first side plate of the middle frame along a third direction; the first connecting slot is located between the two first connecting holes along the third direction; the third direction is perpendicular to the first direction and the second direction; the first spindle is inserted into the first connecting slot and the two first connecting holes; and/or the second rotation structure includes a second spindle, a second connecting slot, and two second connecting holes; the second spindle is disposed on the second side plate of the middle frame; the second connecting slot and the two second connecting holes are all disposed on the first side plate of the frame on the second side; the two second connecting holes are located at two ends of the first side plate of the frame on the second side along the third direction; the second connecting slot is located between the two second connecting holes along the third direction; the third direction is perpendicular to the first direction and the second direction; and the second spindle is inserted into the second connecting slot and the two second connecting holes.

In some embodiments, a locking structure is disposed between any two adjacent frames. The locking structure is configured to lock the two adjacent frames when the battery frame is in the folded state.

In some embodiments, the locking structure includes a snap-fit structure. The snap-fit structure includes a notch and a buckle. The notch and the buckle are disposed on the two adjacent frames respectively. The buckle is snap-fitted with the notch when the battery frame is in the folded state.

In some embodiments, a hollow-out portion is further disposed on the frame. The hollow-out portion is configured to fit an electrical connecting plate of a battery group.

In some embodiments, the hollow-out portion includes a first hollow-out portion and a second hollow-out portion. The first hollow-out portion is located on a side plate and penetrates the side plate along a thickness direction of the side plate. The second hollow-out portion is located on the pallet and penetrates the pallet along a thickness direction of the pallet.

In some embodiments, among any three adjacent frames, two frames located on two opposite sides of a middle frame are identical in structure.

In some embodiments, the frame is made of an insulation material; and/or, the frame is made of a heat insulation material.

Another aspect of this application further includes a battery group, including an electrical connecting plate and a battery module containing a battery. The battery group further includes the battery frame according to this application. The battery frame is in a folded state. The battery module is disposed in each frame of the battery frame. The electrical connecting plate is electrically connected to tabs of different batteries in the battery group. The electrical connecting plate includes a first bend portion and a second bend portion that are connected to each other. The first bend portion and the second bend portion are at an angle to each other and are located in two adjacent frames respectively.

In some embodiments, the electrical connecting plate is located at a hollow-out portion of the battery frame.

In some embodiments, a groove is disposed between the first bend portion and the second bend portion. The groove fits a first spindle or a second spindle of the battery frame.

In some embodiments, the tabs are located on a side of the battery along a third direction. The third direction is perpendicular to a first direction and a second direction; or, the tabs of the battery are located on two opposite sides of the battery along the first direction.

In some embodiments, the battery module includes two batteries, the two batteries are arranged along the third direction, and the tabs of the batteries are located between the two batteries; or, the battery module includes one battery, and the tabs of the battery are located on two opposite sides of the battery along the first direction.

Still another aspect of this application further provides a battery pack, including a box body, and further including the battery group according to this application. The battery group is disposed in the box body.

Another aspect of this application further provides a method for assembling a battery group, including:

placing a battery module containing a battery into each frame of a battery frame that is in an unfolded state;

electrically connecting tabs of different batteries by using an electrical connecting plate; and rotating two adjacent frames oppositely so that the battery frame changes from the unfolded state into a folded state.

In some embodiments, when the tabs of different batteries are electrically connected by using the electrical connecting plate, the electrical connecting plate is placed at a first spindle or a second spindle of the battery frame; and, when the two adjacent frames are rotated oppositely, a first bend portion and a second bend portion of the electrical connecting plate are bent oppositely under action of the first spindle or the second spindle.

This application provides a foldable battery frame, which can effectively increase types of the battery frames and diversify the battery frame.

Especially, the foldable battery frame can be used together with a bendable electrical connecting plate, thereby effectively simplifying a grouping process of the battery group.

Exemplary embodiments of this application are described below in detail with reference to drawings to make other features and advantages of this application clearer.

BRIEF DESCRIPTION OF DRAWINGS

To describe the technical solutions in the embodiments of this application more clearly, the following outlines the drawings to be used in the description of the embodiments of this application. Apparently, the drawings outlined below are merely some embodiments of this application, and a person of ordinary skill in the art may derive other drawings from the outlined drawings without making any creative efforts.

Figure 1:
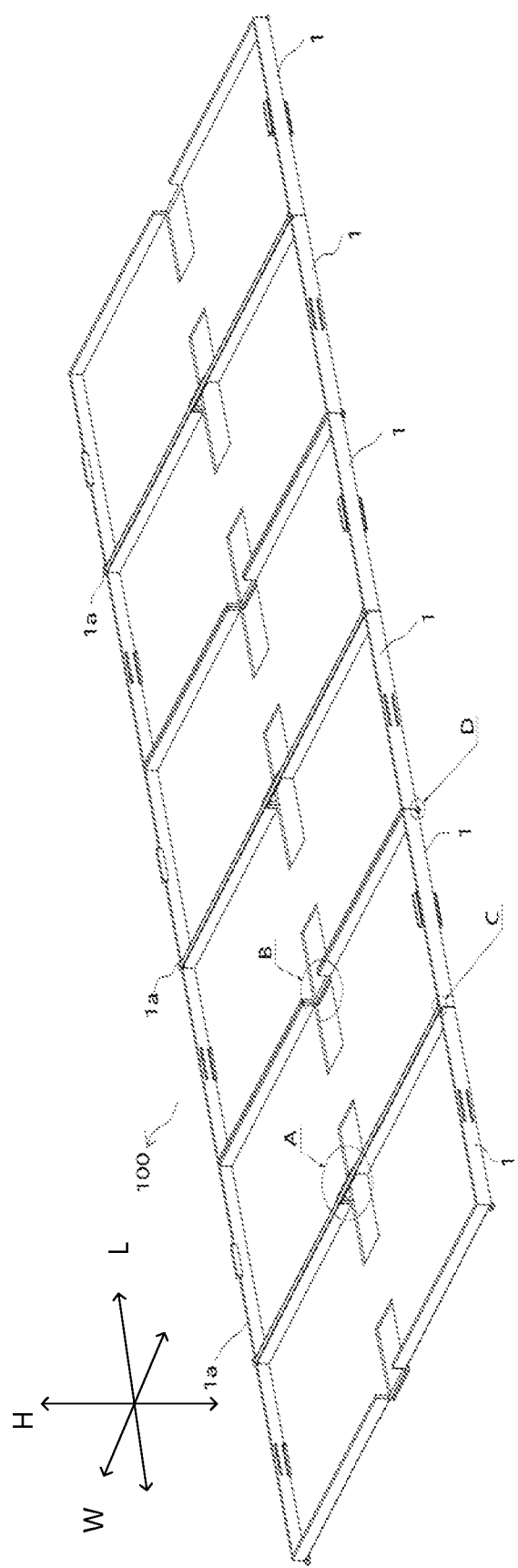
FIG. 1 is an overall schematic structural diagram of a battery frame according to an embodiment of this application.

The drawings are not drawn to scale.

REFERENCE NUMERALS

10. Battery group;
100. Battery frame; 200. Battery module; 300. Electrical connecting plate;
1*a*. Frame unit;
1. Frame;
11. Pallet; 12. Side plate; 121. First side plate; 122. Second side plate; 123. Third side plate; 124. Fourth side plate; 13. First rotation structure; 131. First spindle; 132. First connecting slot; 133. First lug plate; 133*a*. First connecting hole; 14. Second rotation structure; 141. Second spindle; 142. Second connecting slot; 143. Second lug plate; 143*a*. Second connecting hole; 15. Hollow-out portion; 151. First hollow-out portion; 152. Second hollow-out portion; 16. Locking structure; 161. Snap-fit structure; 161*a*. Notch; 161*b*. Buckle;
201. Battery; 201*a*. Tab;
301. First bend portion; 302. Second bend portion; 303. Groove; and
L. First direction; H. Second direction; W. Third direction.

DETAILED DESCRIPTION OF EMBODIMENTS

The following clearly and fully describes the technical solutions in the embodiments of this application with reference to the drawings hereof. Apparently, the described embodiments are merely a part of but not all of the embodiments of this application. The following description of at least one exemplary embodiment is merely illustrative, and is in no way intended as a limitation on this application or the use thereof. All other embodiments derived by a person of ordinary skill in the art based on the embodiments of this application without making any creative efforts fall within the protection scope of this application.

The technologies, methods, and devices known to a person of ordinary skill in the related art may be described without going into details, but as appropriate, such technologies, methods, and device are regarded as a part of the granted specification.

Understandably, in the context of this application, a direction or positional relationship indicated by the directional terms such as "before", "after", "upper", "lower", "left", "right", "vertical", "perpendicular", "horizontal", "top", and "bottom" is generally a direction or positional relationship based on the illustration in the drawings, and is merely intended for ease or brevity of description of this application. Unless otherwise specified to the contrary, such directional terms do not indicate or imply that the indicated device or component is necessarily in the specified direction or necessarily constructed or operated in the specified direction. Therefore, such terms are not to be understood as a limitation on the protection scope of this application. The directional terms "in" and "out" used in connection with a part mean inward and outward directions relative to the contour of the part.

Understandably, in the context of this application, the terms such as "first" and "second" used to qualify parts are merely intended for ease of distinguishing the parts. Unless otherwise specified, no special meaning is ascribed to such terms. Therefore, the terms are not to be understood as a limitation on the protection scope of this application.

In addition, the technical features mentioned in different embodiments of this application described below may be combined with each other so long as they do not conflict with each other.

FIG. 1 to FIG. 16 show a battery frame 100 and a battery group 10 according to this application.

To clearly describe directions and positions below, the directions are defined using the coordinate system shown in FIG. 1. In the coordinate system, a coordinate axis L represents a first direction, and is a direction in which a first side plate 121 and a second side plate 122 of a frame 1 are arranged oppositely, and is an arrangement direction of the frames 1 when the battery frame 100 is in the unfolded state, and is parallel to a plane in which a pallet 11 of the frame 1 is located, and is an arrangement direction of the battery modules 200 in the battery group 10, and is also a length direction of the battery group 10. A coordinate axis H represents a second direction, which is perpendicular to the plane in which the pallet 11 of the frame 1 is located, that is, perpendicular to the first direction L. The second direction H is also a height direction of the battery group 10. A coordinate axis W represents a third direction, and is perpendicular to the coordinate axis L and the coordinate axis H, that is, perpendicular to the first direction L and the second direction H, namely, perpendicular to the first direction L and parallel to the plane in which the pallet 11 is located. The third direction is also a width direction of the battery group 10.

Based on the foregoing definitions of directions, the following describes this application with reference to FIG. 1 to FIG. 16. All the terms used to indicate a direction or a position relationship below, such as "up", "down", "top", and "bottom", are termed relative to the second direction H.

With reference to FIG. 1 to FIG. 16, the battery group 10 includes a battery module 200, an electrical connecting plate 300, a battery frame 100, and the like. The battery module 200 and the electrical connecting plate 300 are both disposed in the battery frame 100.

Figure 8:
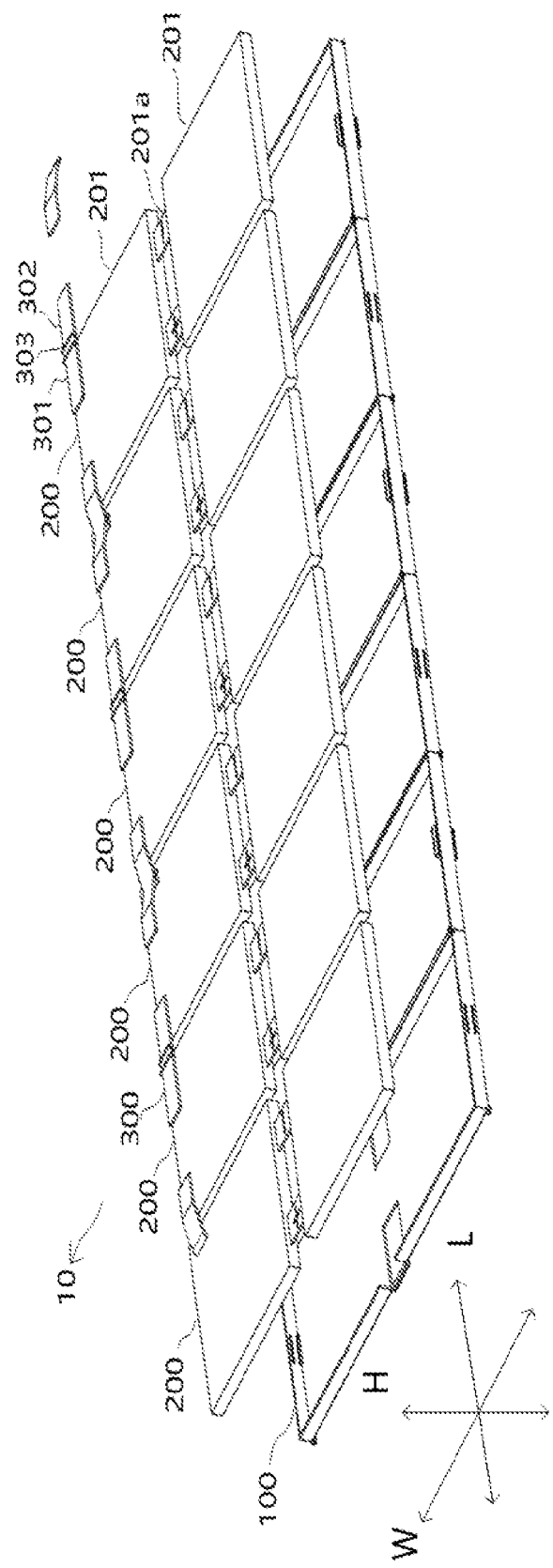
FIG. 8 is a schematic structural exploded view of a battery group according to an embodiment of this application.
Figure 12:
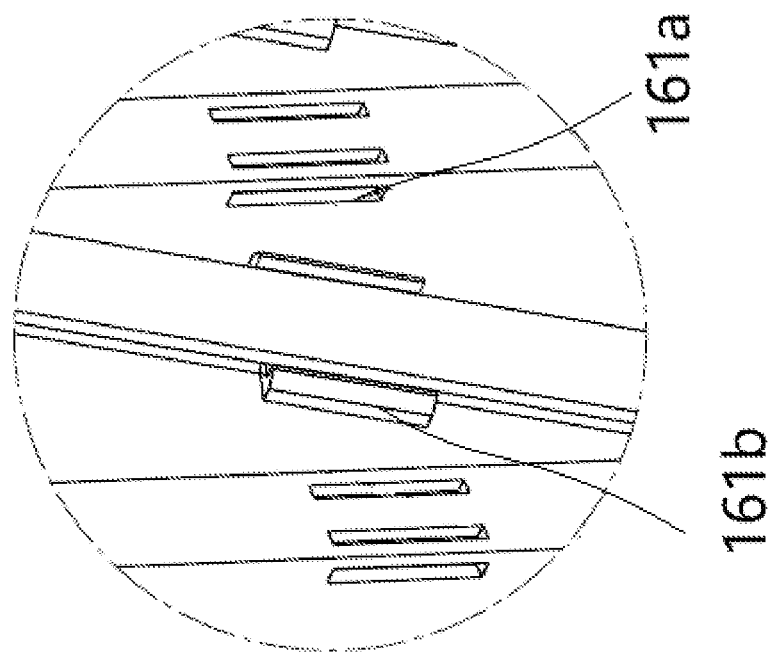
FIG. 12 is local detailed view of a position E shown in FIG. 11.
Figure 13:
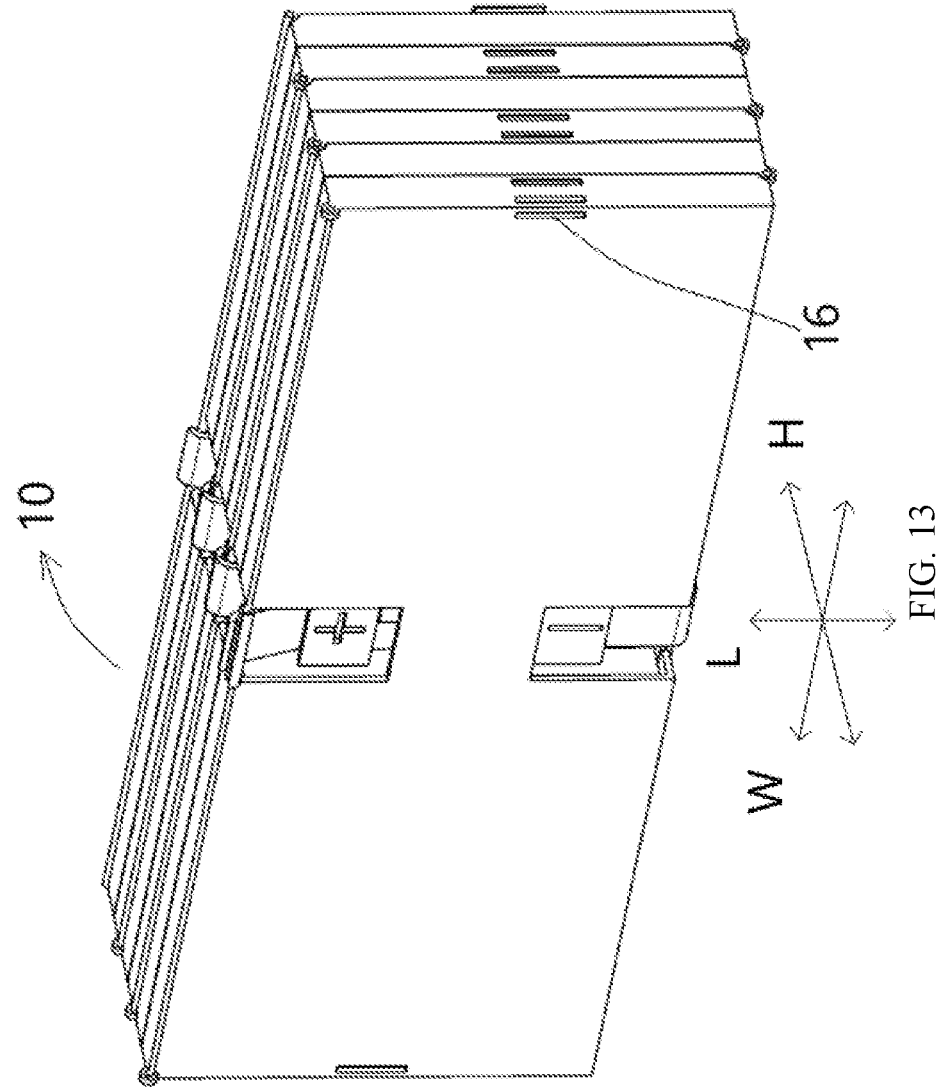
FIG. 13 is a schematic status diagram of the battery group shown in FIG. 8 when the battery group is folded and locked.
Figure 14:
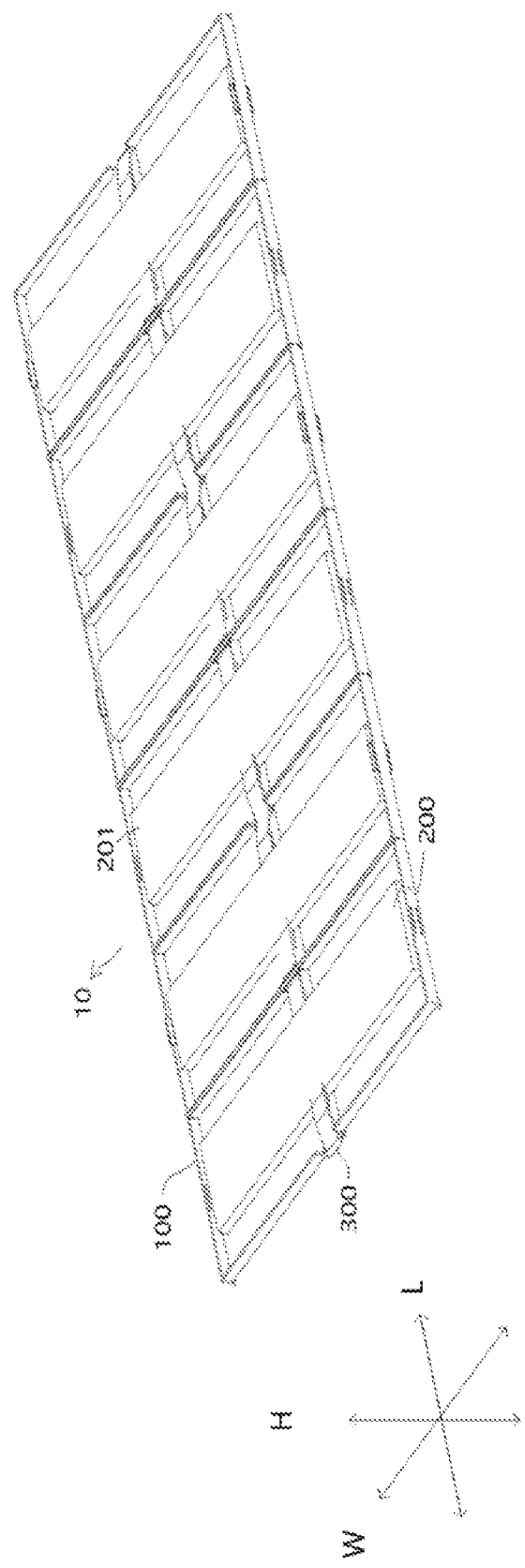
FIG. 14 is a schematic structural diagram of a battery group according to another embodiment of this application.
Figure 15:
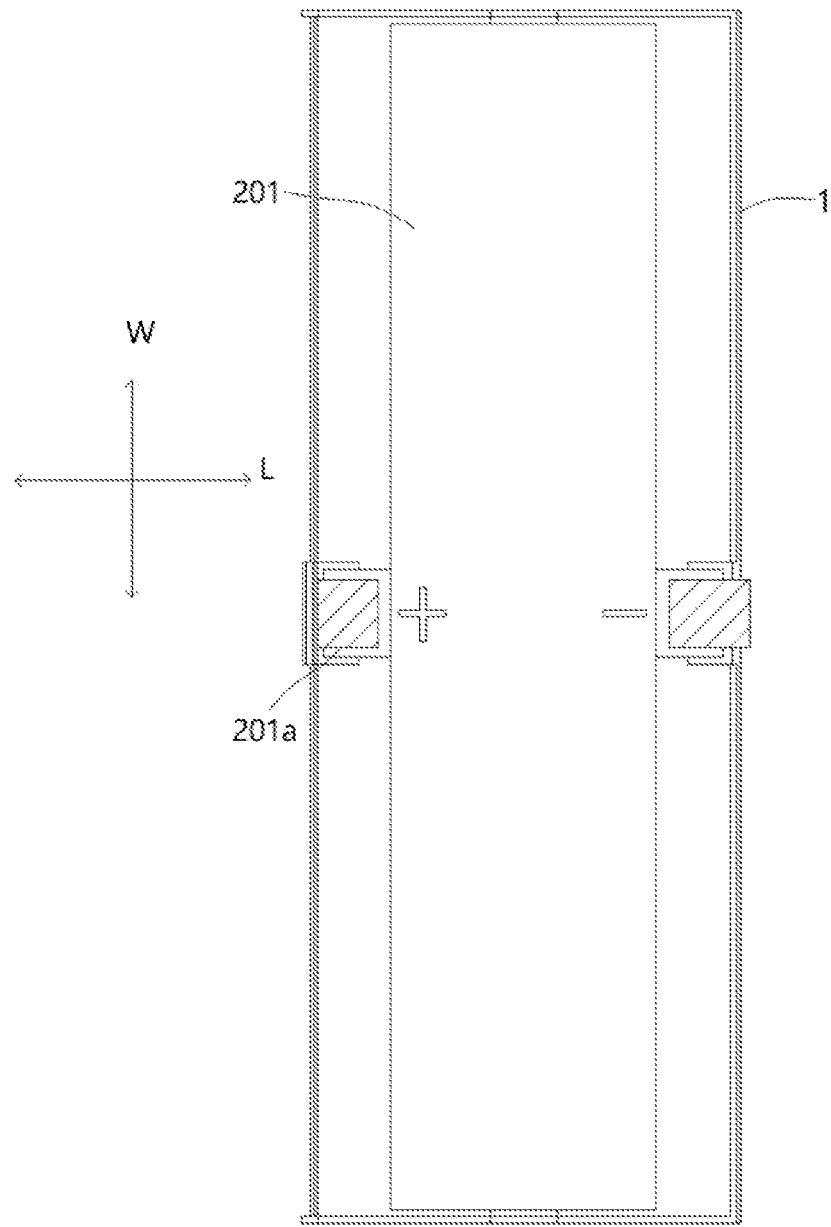
FIG. 15 is a schematic diagram of combining a battery module shown in FIG. 14 with a frame.

As shown in FIG. 8 to FIG. 16, the battery module 200 is a core part of the battery group 10, and includes a battery 201, and is configured to generate electrical energy. The quantity of batteries 201 in the battery module 200 is not limited, and may be one, two or more batteries 201. For example, as shown in FIG. 8, in some embodiments, the battery module 200 may include two batteries 201, and the two batteries 201 may be arranged along the third direction W. For another example, as shown in FIG. 14, in other embodiments, the battery module 200 may include only one battery 201.

The battery 201 is electrically connectable to the outside through tabs 201a. The tabs 201a include a positive tab and a negative tab, corresponding to a positive electrode and a negative electrode of the battery 201 respectively. The tabs 201a may be arranged in diverse manners. For example, as can be learned from FIG. 8, in some embodiments, the tabs 201a may be located at an end of the battery 201 along the third direction W. In addition, when the battery module 200 includes two batteries 201 arranged along the third direction W, the tabs 201a of the two batteries 201 may be disposed in opposite directions. In this case, the tabs 201a of the batteries 201 are located between the two batteries 201, so that all the batteries 201 can be connected conveniently by using fewer electrical connecting plates 300. For another example, as can be learned from FIG. 15, the tabs 201a may also be located on two opposite sides of the battery 201 along the first direction L. In addition, the tabs 201a may be located in the middle of the battery module 200 along the third direction W, so as to make the structure more symmetrical.

In addition, in the illustrated embodiment, the battery 201 is a pouch-cell battery. The pouch-cell battery is a type of battery different from a hard-case battery, and its housing is no longer made of a hard case such as aluminum alloy or stainless steel, but made of a polymer housing such as an aluminum-laminated film. The pouch-cell battery possesses advantages such as a light weight, a small thickness, and high safety performance, but possesses disadvantages such as low rigidity and low strength.

To improve charge and discharge capacities of the battery group 10, as shown in FIG. 8 to FIG. 16, the quantity of battery modules 200 in the battery group 10 may be more than 1, for example, may be 2 or more ("more" means at least three). Specifically, in the illustrated embodiment, the battery group 10 includes a plurality of battery modules 200. In addition, to reduce space occupation, the plurality of battery modules 200 may be stacked in groups.

The batteries 201 in a battery module 200 and between different battery modules 200 are electrically connected by an electrical connecting plate 300. The electrical connecting plate 300, also called a busbar, is configured to electrically connect the tabs 201a of different batteries 201, so as to implement serial connection, parallel connection, or serial-parallel connection of the batteries 201 in the battery group 10. Specifically, in the embodiments shown in FIG. 8 to FIG. 15, the electrical connecting plate 300 is disposed not only between the tabs 201a of different batteries 201 in an identical battery module 200, but also the electrical connecting plate 300 is disposed between the tabs 201a of different battery modules 200. To be specific, the electrical connecting plate 300 not only connects the tabs 201a of different batteries 201 in an identical battery module 200, but also connects the tabs 201a between different battery modules 200. In the embodiments shown in FIG. 14 to FIG. 16, one battery module 200 contains merely one battery 201. Therefore, the electrical connecting plate 300 is disposed merely between the tabs 201a of different battery modules 200. That is, the electrical connecting plate 300 merely connects the tabs 201a of different battery modules 200.

Figure 9:
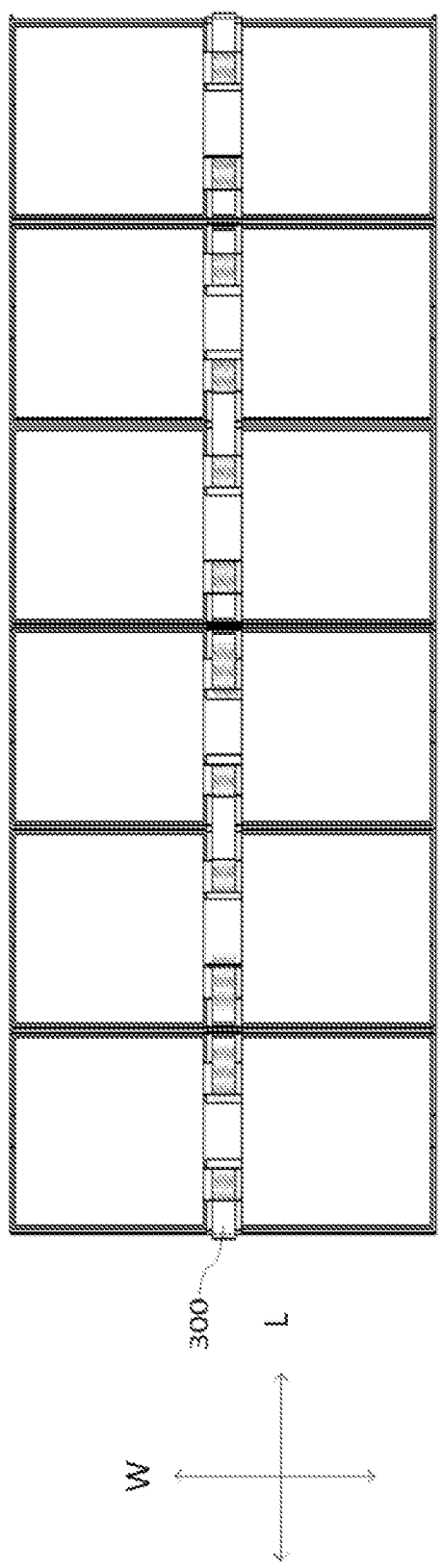
FIG. 9 is a schematic diagram of welding status of an electrical connecting plate shown in FIG. 8.

The electrical connecting plate 300 may implement electrical connection of different batteries 201 by being welded to the tabs 201a. A shaded part in FIG. 9 shows a welding region of the electrical connecting plate 300. As mentioned above, the tabs 201a are located in the middle of the battery module 200 along the third direction W. Therefore, after being welded, the electrical connecting plate 300 is also located in the middle of the battery module 200 along the third direction W.

As shown in FIG. 8 to FIG. 16, in this application, the electrical connecting plate 300 is bendable. Specifically, the electrical connecting plate 300 includes a first bend portion 301 and a second bend portion 302. The first bend portion 301 and the second bend portion 302 are bendably connected. Based on this, the first bend portion 301 and the second bend portion 302 are bent oppositely to implement bending of the electrical connecting plate 300, and different battery modules 200 in the battery group 10 can be folded in groups conveniently, thereby reducing space occupation, increasing an energy density, increasing flexibility of use, and expanding an application scope. As the battery frame 100 is folded, the electrical connecting plate 300 is bent. When the battery frame 100 is in the folded state, the first bend portion 301 and the second bend portion 302 are at an angle to each other, and are located in two adjacent frames 1 respectively.

In addition, as shown in FIG. 8, a groove 303 is disposed between the first bend portion 301 and the second bend portion 302. The groove 303 is a U-shaped groove. An advantage of the groove 303 is to facilitate folding of the electrical connecting plate 300 under the action of the battery frame 100. This will be described in more detail later with reference to a structure of the battery frame 100.

Figure 2:
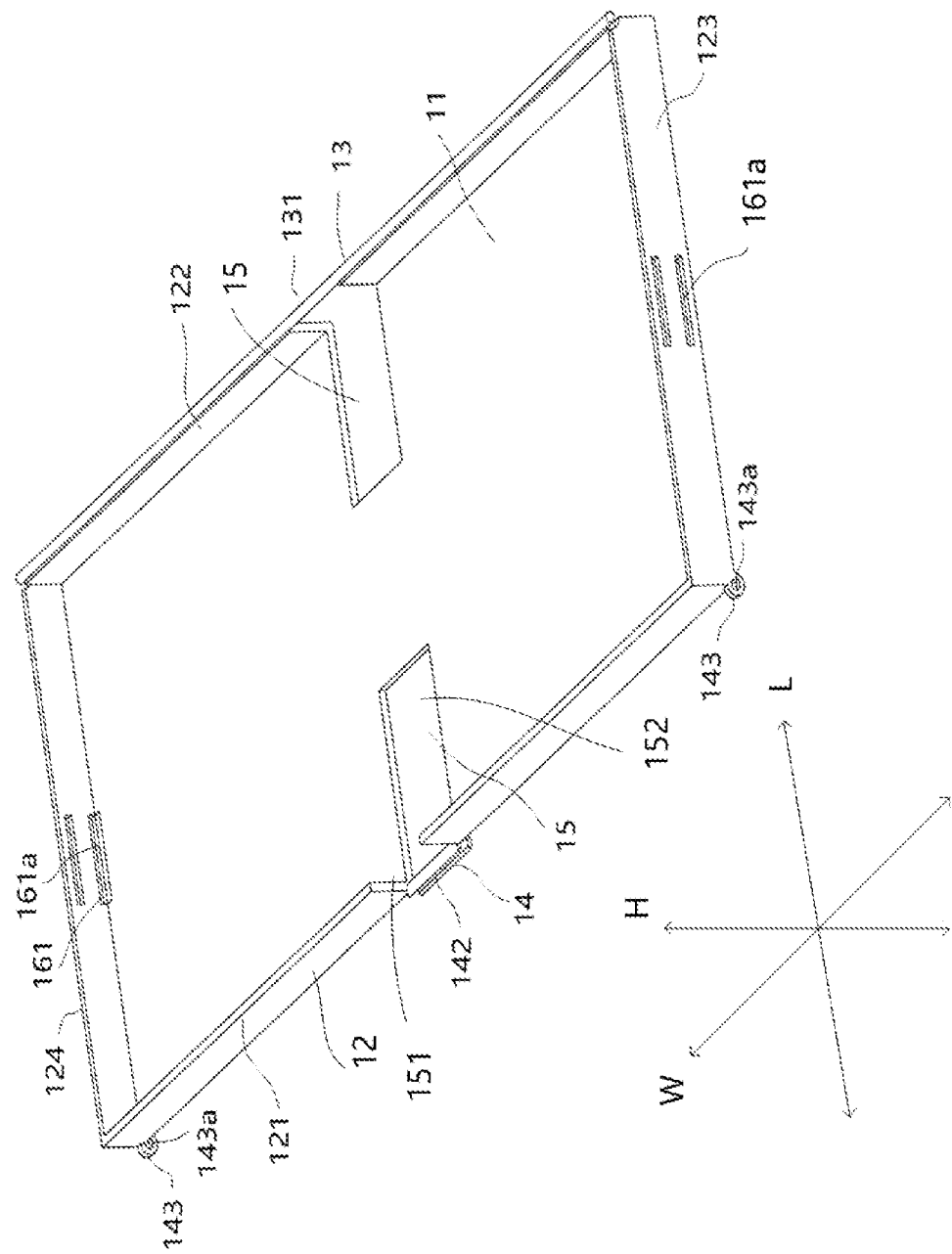
FIG. 2 is a schematic structural diagram of one of two adjacent frames.
Figure 3:
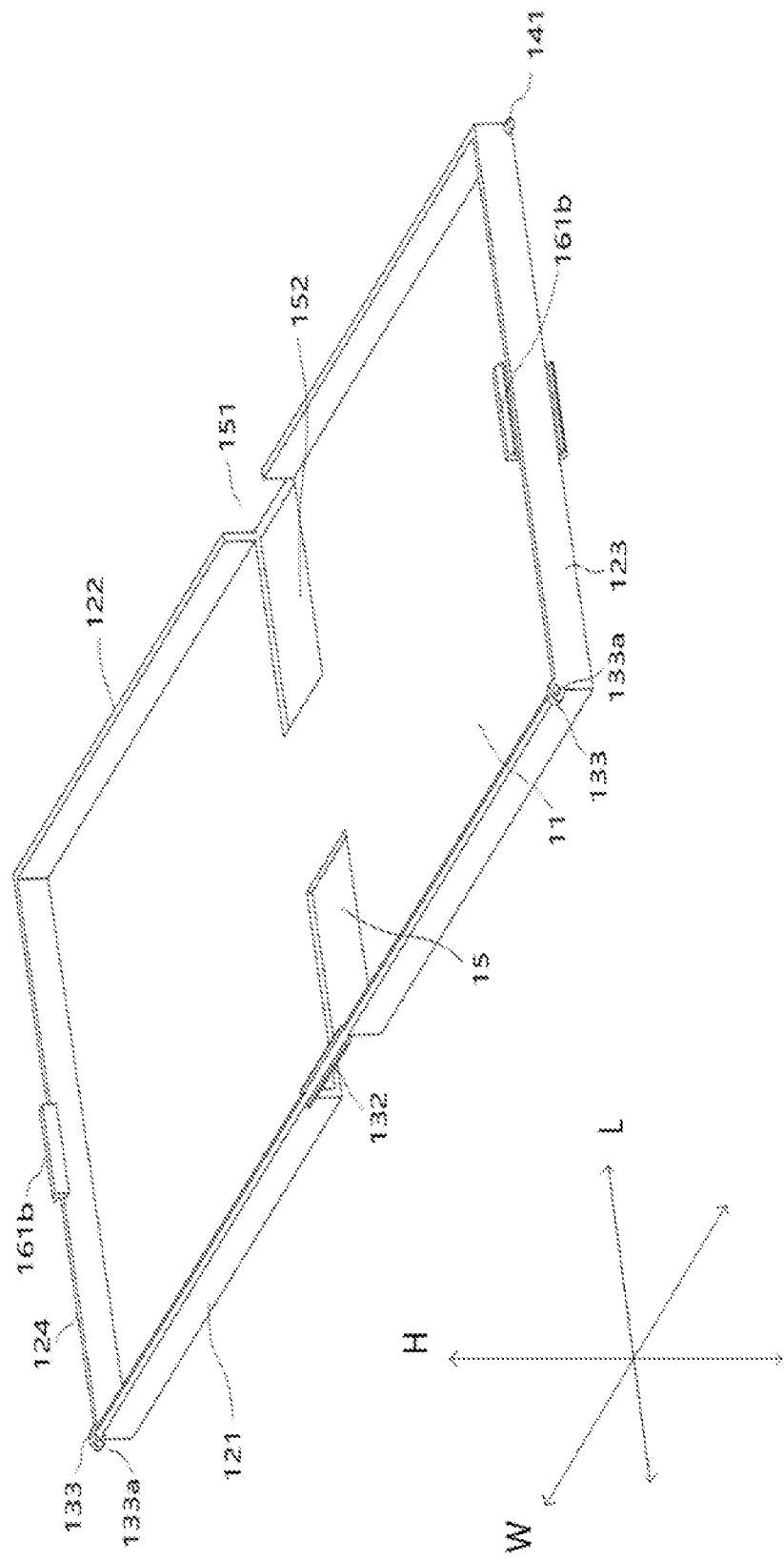
FIG. 3 is a schematic structural diagram of the other of two adjacent frames.

The battery frame 100 is configured to accommodate all the battery modules 200 of the battery group 10, protect and support each of the battery modules 200, and increase strength. The battery frame 100 includes a frame 1. The frame 1 includes a pallet 11 and side plates 12. The side plates 12 are peripherally connected to the pallet 11. In this way, the frame 1 provides a cavity that is configured to accommodate the battery module 200 and that is open at the top. Specifically, as shown in FIG. 2 to FIG. 3, a shape of the frame 1 adapts to a shape of the battery module 200, and is cuboidal. The pallet 11 is used as a bottom plate, and is opposite to an open end of the frame 1, and is configured to support the battery module 200. The side plates 12 include a first side plate 121, a second side plate 122, a third side plate 123, and a fourth side plate 124. The first side plate 121 and the second side plate 122 are connected onto two opposite sides of the pallet 11 along the first direction L. The third side plate 123 and the fourth side plate 124 are connected onto two opposite sides of the pallet 11 along the third direction W. Understandably, the shape of the frame 1 is not limited to a rectangle, but may be a circle or another shape, and is configurable depending on the shape of the battery module 200. In addition, adhesive, double-sided tape, a buckle structure, or any combination thereof may be disposed on the pallet 11 to fix the battery module 200 in the frame 1.

The quantity of frames 1 is identical to the quantity of battery modules 200. One battery module 200 is disposed in each frame 1. In this way, each of the battery modules 200 can be supported and protected by a separate frame 1, and the strength is improved more effectively. The battery group 10 may include at least two battery modules 200. Therefore, the battery frame 100 may include at least two frames 1 accordingly. Specifically, in the illustrated embodiment, if the battery modules 200 are plural in number, the frames 1 are also plural in number.

To make it convenient for the battery module 200 and the electrical connecting plate 300 to fold in groups, in this application, the battery frame 100 is configured to be foldable. As shown in FIG. 1 to FIG. 10, all the frames 1 of the battery frame 100 are sequentially connected along the first direction L, and any two adjacent frames 1 are rotatably connected to each other. In this way, the adjacent frames 1 are rotated opposite to each other to implement folding of the battery frame 100, so that the battery frame 100 changes from the unfolded state to the folded state. Further, this drives the battery module 200 and the electrical connecting plate 300 to fold in groups to implement folding of the battery group 10. In the unfolded state, all the frames 1 of the battery frame 100 are arranged alongside in the first direction L. In the folded state, all the frames 1 of the battery frame 100 are stacked in the second direction H.

Figure 10:
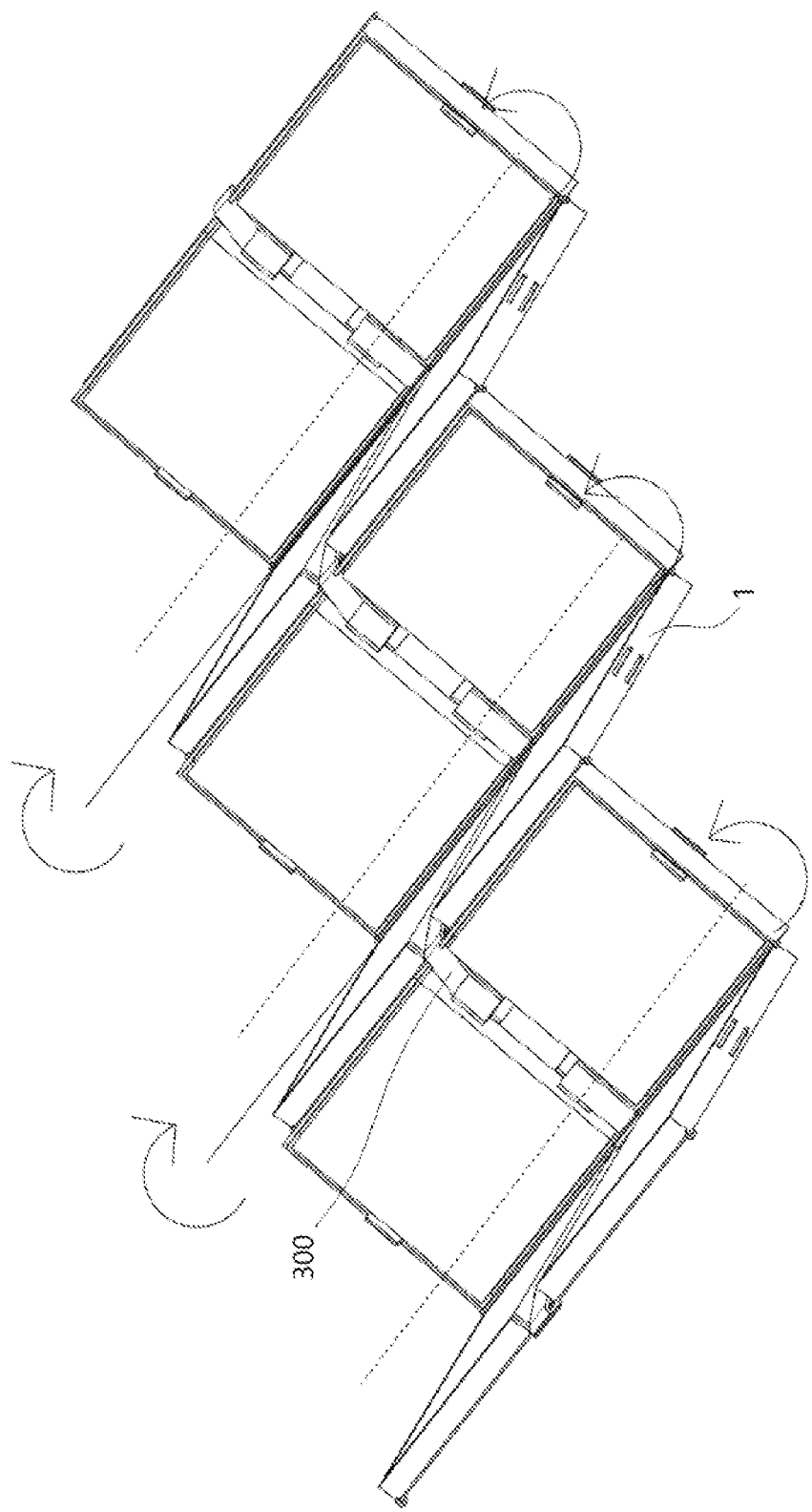
FIG. 10 shows a folding process of the battery group shown in FIG. 8.

As shown in FIG. 10, when the battery frame 100 includes a plurality of frames 1, the plurality of frames 1 can be rotatably connected in pairs. In addition, among any three adjacent frames 1, the middle frame 1 is folded in an opposite direction against the two frames 1 located on two opposite sides of the middle frame 1. Based on this, the battery frame 100 can be folded in an S shape, thereby facilitating smoother folding of the battery group 10.

To enable the middle frame 1 to fold in an opposite direction against the two frames 1 located on two opposite sides of the middle frame 1, as shown in FIG. 1 to FIG. 7 and FIG. 10, among any three adjacent frames 1, the frame 1 located in the middle along the first direction W may be rotatably connected to a frame 1 on a first side of the middle frame 1 through a first rotation structure 13, and may be rotatably connected to a frame 1 on a second side of the middle frame 1 through a second rotation structure 14. The first rotation structure 13 and the second rotation structure 14 are located at two ends of the frame 1 along the second direction H. Specifically, as shown in FIG. 1 to FIG. 7, the first side plate 121 of the middle frame 1 is rotatably connected to the second side plate 122 of the frame 1 on the first side through the first rotation structure 13. At the same time, the second side plate 122 of the middle frame 1 is rotatably connected to the first side plate 121 of the frame 1 on the second side through the second rotation structure 14. In addition, in the second direction H, the first rotation structure 13 is located at an upper end of the side plate 12 (that is, an end of the side plate 12, the end being away from the pallet 11), and the second rotation structure 14 is located at a lower end of the side plate 12 (that is, an end of the side plate 12, the end being close to the pallet 11). In this way, as shown in FIG. 10, when folding in groups is required, the middle frame 1 can be folded upward against the frame 1 on the first side, and folded downward against the frame 1 on the second side, so as to implement S-shaped folding shown by arrows in FIG. 10. Alternatively, as a variation, the first rotation structure 13 may be located at the lower end of the frame 1, and the second rotation structure 14 may be located at the upper end of the frame 1. In this case, the required S folding can also be implemented.

The first rotation structure 13 and the second rotation structure 14 may be in diverse structural forms, for example, may be hinges (or pivot bolts), or may be spindle-hole fitting structures. Specifically, as shown in FIG. 1 to FIG. 7, in some embodiments, both the first rotation structure 13 and the second rotation structure 14 may be spindle-hole fitting structures, so as to simplify the structure and facilitate processing.

As can be learned from FIG. 2, FIG. 3, FIG. 4, and FIG. 6, the first rotation structure 13 includes a first rotation portion and a second rotation portion that are rotatably fitted with each other. The first rotation portion is disposed on a side plate 12 of the frame 1 on the first side (specifically, disposed at an upper end of the second side plate 122 of the frame 1 on the first side) and includes a first spindle 131. The second rotation portion is disposed on a side plate 12 of the middle frame 1 (specifically, disposed at an upper end of the first side plate 121 of the middle frame 1) and includes a first connecting slot 132 and two first connecting holes 133a. The two first connecting holes 133a are located at two ends of the side plate 12 of the middle frame 1 (specifically, the first side plate 121 of the middle frame 1) along the third direction W. The first connecting slot 132 is located between the two first connecting holes 133a along the third direction W, and the first spindle 131 is inserted into the first connecting slot 132 and the two first connecting holes 133a. Based on this, the first spindle 131 is rotatably fitted with the first connecting slot 132 and the two first connecting holes 133a. In this way, under the action of the first rotation structure 13, the middle frame 1 can rotate against the frame 1 on the first side to implement the folding between the middle frame and the frame on the first side.

As shown in FIG. 1 to FIG. 3, FIG. 5, and FIG. 7, the second rotation structure 14 includes a third rotation portion and a fourth rotation portion. The third rotation portion is disposed on a side plate 12 of the middle frame 1 (specifically, disposed at a lower end of the second side plate 122 of the middle frame 1) and includes a second spindle 141. The fourth rotation portion is disposed on a side plate 12 of the frame 1 on the second side (specifically, disposed at a lower end of the first side plate 121 of the frame 1 on the second side) and includes a second connecting slot 142 and two second connecting holes 143a. The two second connecting holes 143a are located at two ends of a side plate 12 of the frame 1 on the second side (specifically, the first side plate 121 of the frame 1 on the second side) along the third direction W. The second connecting slot 142 is located between the two second connecting holes 143a along the third direction W. The second spindle 141 is inserted into the second connecting slot 142 and the two second connecting holes 143a. Based on this, the second spindle 141 is rotatably fitted with the second connecting slot 142 and the two second connecting holes 143a. In this way, under the action of the second rotation structure 14, the middle frame 1 can rotate against the frame 1 on the second side to implement the folding between the middle frame and the frame on the second side.

Figure 4:
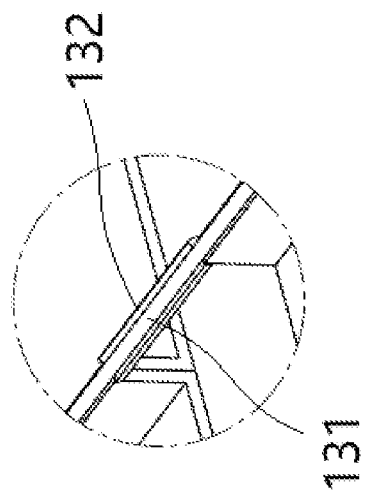
FIG. 4 is local detailed view of a position A shown in FIG. 1.
Figure 5:
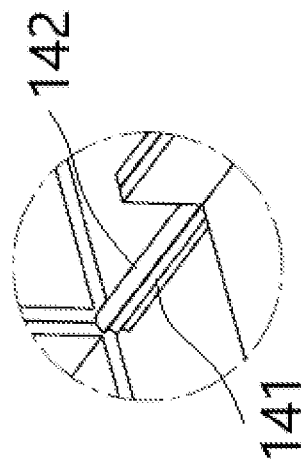
FIG. 5 is local detailed view of a position B shown in FIG. 1.

As shown in FIG. 4 and FIG. 5, the first connecting slot 132 and/or the second connecting slot 142 may be U-shaped slots, so that the first spindle 131 and/or the second spindle 142 can be conveniently placed into and rotatably fitted with corresponding connecting slots. In addition, as shown in FIG. 1 to FIG. 3, the first connecting slot 132 and/or the second connecting slot 142 may be specifically located in the middle of the frame 1 along the third direction W. In this case, as described above, the electrical connecting plate 300 is also located in the middle of the frame 1 along the third direction W. Therefore, the electric connecting plate 300 corresponds to a position of the first connecting slot 132 or the second connecting slot 142. The groove 303 on the electric connecting plate 300 can fit with the first connecting slot 132 or the second connecting slot 142 to limit the position of the first spindle 131 or the second spindle 141. Especially, when the groove 303, the first connecting slot 132, and the second connecting slot 142 are all U-shaped slots, the groove 303 can just be snap-fitted with the first connecting slot 132 or the second connecting slot 142, thereby being more effective in limiting the position. Moreover, when the battery frame 100 is folded, the first spindle 131 or the second spindle 141 can transmit torque to the electrical connecting plate 300 through the groove 303 and drive the electrical connecting plate 300 to bend. As shown in FIG. 8, the groove 303 of the electrical connecting plate 300 located at the first spindle 131 is disposed on an upper surface of the electrical connecting plate 300, so as to fit more effectively with the first spindle 131 located at the upper end of the frame 1. The groove 303 of the electrical connecting plate 300 located at the second spindle 141 may be disposed on a lower surface of the electrical connecting plate 300, so as to fit more effectively with the second spindle 141 located at the lower end of the frame 1.

Figure 6:
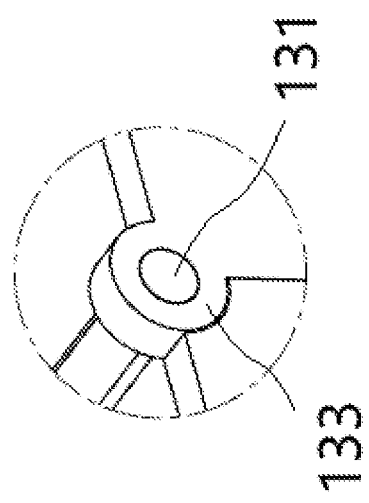
FIG. 6 is local detailed view of a position C shown in FIG. 1.

To conveniently dispose the first connecting hole 133a, as shown in FIG. 3 and FIG. 6, a first lug plate 133 is disposed at both ends of a side plate 12 of the middle frame 1 (specifically, the first side plate 121 of the middle frame 1) along the third direction W. The first connecting hole 133a is disposed on the first lug plate 133.

Figure 7:
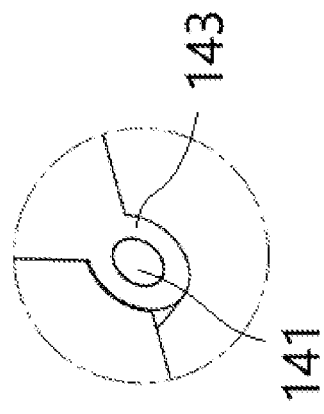
FIG. 7 is local detailed view of a position D shown in FIG. 1.

In addition, to facilitate the disposition of the second connecting hole 143a, as shown in FIG. 7, a second lug plate 143 is disposed at both ends of a side plate 12 of the frame 1 on the second side (specifically, the first side plate 121 of the frame 1 on the second side) along the third direction W. The second connecting hole 143a is disposed on the second lug plate 143.

Specifically, as can be learned from FIG. 6 and FIG. 7, in the illustrated embodiment, both the first lug plate 133 and the second lug plate 143 are circular lug plates. In addition, an arc-shaped slot is disposed at a position on the side plate 12 on which the first spindle 131 is disposed, where the position corresponds to the first lug plate 133, and an arc-shaped slot is disposed at a position on the side plate 12 on which the second spindle 141 is disposed, where the position corresponds to the second lug plate 143. The arc-shaped slots form a way to avoid the circular lug plates and prevent interference, so that it is convenient to oppositely rotate adjacent frames 1 more smoothly.

In addition, as shown in FIG. 1 to FIG. 3, in some embodiments, a hollow-out portion 15 is further disposed on the frame 1. The hollow-out portion 15 is configured to fit the electrical connecting plate 300 of the battery group 10. As can be seen from FIG. 11, the electrical connecting plate 300 is located at the hollow-out portion 15. The hollow-out portion 15 disposed can avoid the electrical connecting plate 300 after the battery module 200 and the electrical connecting plate 300 are assembled into the frame 1. On the one hand, this provides space for the bending of the electrical connecting plate 300 and facilitates smooth implementation of a folding process of the electrical connecting plate 300. On the other hand, this reserves space for a welding tool and a welding operation of the electrical connecting plate 300, facilitates a welding process of the electrical connecting plate 300, and improves assembly efficiency of the battery group 10. In addition, the electrical connecting plate 300 can be exposed outside the frame 1 after folding and grouping, thereby facilitating operations such as sampling of voltage of the electrical connecting plate 300. The voltage of the electrical connecting plate 300 may be sampled by using a printed circuit board (PCB) or a flexible printed circuit board (FPC).

Specifically, as can be seen from FIG. 3, the hollow-out portion 15 may include a first hollow-out portion 151 and a second hollow-out portion 152 that communicate with each other. The first hollow-out portion 151 is located on a side plate 12 and penetrates the side plate 12 along a thickness direction of the side plate 12. The second hollow-out portion 152 is located on the pallet 11 and penetrates the pallet 11 along a thickness direction of the pallet 11. Based on this, the hollow-out portion 15 is L-shaped, and can sufficiently avoid the electrical connecting plate 300 in both a flat laying state and a folded state. Understandably, the thickness direction of the side plate 12 means a size of the side plate 12 in the first direction L, and the thickness direction of the pallet 11 means a size of the pallet 11 in the second direction H.

More specifically, the hollow-out portion 15 is located in the middle of the frame 1 along the third direction W, thereby being adaptable to the feature that the electrical connecting plate 300 is located in the middle of the frame 1 along the third direction W, and facilitating the hollow-out portion 15 to avoid the electrical connecting plate 300 located in the middle of the frame 1 along the third direction W. In addition, as mentioned above, both the first connecting slot 132 and the second connecting slot 142 are also located in the middle of the frame 1 along the third direction W. The hollow-out portion 15 corresponds to the positions of the first connecting slot 132 and the second connecting slot 142 in the third direction W. The hollow-out portion 15 at the first connecting slot 132 is located below the first connecting slot 132, and the hollow-out portion 15 at the second connecting slot 142 is located above the second connecting slot 142.

In addition, as shown in FIG. 1 to FIG. 3, the hollow-out portion 15 is disposed on two opposite sides of the frame 1 along the first direction L. Specifically, the first hollow-out portion 151 is disposed on both the first side plate 121 and the second side plate 122, and a second hollow-out portion 152 is disposed correspondingly at both ends of the pallet 11 along the first direction W, thereby facilitating avoidance of both electrical connecting plates 300 located on two opposite sides along the first direction L in the frame 1.

Figure 16:
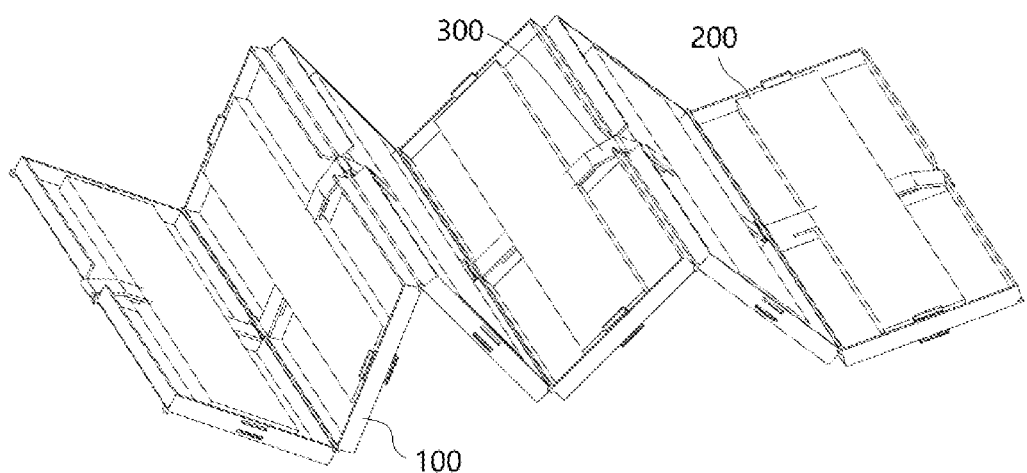
FIG. 16 shows a folding process of the battery group shown in FIG. 14.

Based on the foregoing settings, as shown in FIG. 8 to FIG. 9 or FIG. 14, when the battery frame 100 is in the unfolded state, each battery module 200 may be placed into a corresponding frame 1, and the electrical connecting plate 300 may be disposed in place and welded. The tabs 201*a* of different batteries 201 are electrically connected by using the electrical connecting plate 300, so that the battery module 200, the electrical connecting plate 300, and the battery frame 100 are integrated. Subsequently, as shown in FIG. 10 or FIG. 16, the two adjacent frames 1 may be rotated oppositely to fold the battery frame 100 into an S shape, thereby changing the battery frame 100 from the unfolded state to a folded state and implementing assembly of the battery group 10. The placement, welding, and folding herein may be automatically performed by automated production equipment, and production efficiency is high. Specifically, the electrical connecting plate 300 is placed at the spindles (that is, the first spindle 131 and the second spindle 141) of the battery frame 100. Therefore, during the folding of the battery frame 100, the first bend portion 301 and the second bend portion 302 of the electrical connecting plate 300 are bent oppositely under the action of the spindle, and the electrical connecting plate 300 can automatically bend as the battery frame 100 folds, thereby further simplifying the grouping process of the battery group 10.

Figure 11:
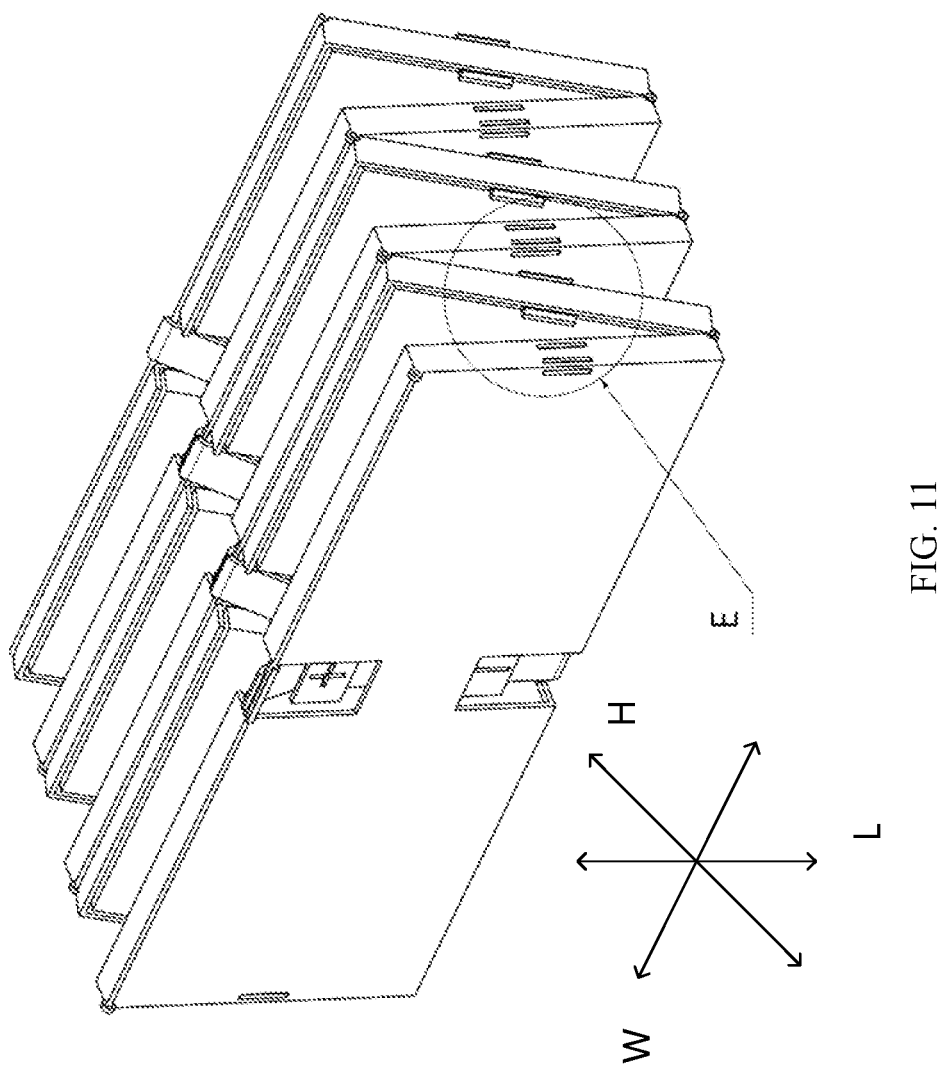
FIG. 11 is a schematic status diagram of the battery group shown in FIG. 8 when the battery group is folded but not locked.

To keep the battery group 10 in a desired folded state after the folding, as shown in FIG. 13, in the battery frame 100 according to this application, a locking structure 16 may be disposed between any two adjacent frames 1. The locking structure 16 is configured to lock two adjacent frames 1 in the folded state. Specifically, as shown in FIG. 11 to FIG. 12, the locking structure 16 may include a snap-fit structure 161.

A notch 161*a* and a buckle 161*b* of the snap-fit structure 161 are disposed on the two adjacent frames 1 respectively. In this way, when the battery frame 100 is folded in place, the buckle 161*b* can be inserted into the notch 161*a*, the adjacent frames 1 are fastened to each other and clocked together, and the battery frame 100 is kept in the folded state more reliably prevented from being accidentally unfolded.

In this application, as shown in FIG. 1, in any three adjacent frames 1, two frames 1 located on two opposite sides of a middle frame 1 may adopt an identical structure, thereby simplifying the structure, facilitating modularization of the battery frame 100, reducing production costs, and improving production efficiency.

Specifically, as shown in FIG. 1 to FIG. 3, in some embodiments, the frames 1 in the battery frame 100 are classed into two types. One type is called a first frame, as shown in FIG. 1 and FIG. 2. A fourth rotation portion (specifically, a second connecting hole 143*a* and a second connecting slot 142) is disposed at a lower end of the first side plate 121 of the first frame, and a first rotation portion (specifically, a first spindle 131) is disposed at an upper end of the second side plate 122 of the first frame. The other type is called a second frame, as shown in FIG. 1 and FIG. 3. A second rotation portion (specifically, a first connecting hole 133*a* and a first connecting slot 132) that fits the first rotation portion is disposed at an upper end of the first side plate 121 of the second frame. A third rotation portion (specifically, the second spindle 141) that fits the fourth rotation portion is disposed at the lower end of the second side plate 122 of the second frame. In addition, one first frame and one second frame are arranged adjacently to form a frame unit 1*a*. The entire battery frame 100 is formed by one, two or more frame units 1*a* that are arranged alongside in the first direction L. In other words, the battery frame 100 includes the frame unit 1*a*, and the frame unit 1*a* includes the first frame and the second frame that are arranged alongside in the first direction L. The second side plate 122 of the first frame is rotatably connected to the first side plate 121 of the second frame through coordination between the first rotation portion and the second rotation portion (the first rotation structure 13). When the quantity of frame units 1*a* is two or more, adjacent frame units 1*a* are rotatably connected to each other through coordination between the third rotation portion and the fourth rotation portion (the second rotation structure 14). To be specific, the first frames and the second frames are arranged alternately and rotatably connected to each other, so that the battery frame 100 can be folded along an S-shaped trace. In this case, merely two types of frames 1, this is, the first frame and the second frame, need to be produced. Therefore, design and production costs are lower, the degree of modularization is higher, the assembly is simpler and more convenient, automated production is facilitated, and the production efficiency is higher.

In addition, as shown in FIG. 2 and FIG. 3, a hollow-out portion 15 is disposed on both the first frame and the second frame. The hollow-out portion 15 is located not only on the first side plate 121, but also on the second side plate 122. At the same time, a notch 161*a* is disposed on both the third side plate 123 and the fourth side plate 124 of the first frame, and a corresponding buckle 161*b* is disposed on the third side plate 123 and the fourth side plate 124 of the second frame. Moreover, the notch 161*a* is disposed at two ends of the third side plate 123 and the fourth side plate 124 of the first frame along the second direction H, and a corresponding buckle 161*b* is disposed at two ends of the third side plate 123 and the fourth side plate 124 of the second frame along the second direction H. In this way, the second frame (or the first frame) can be conveniently snap-fastened to the two adjacent first frames (or second frames) on two opposite sides to implement locking in the folded state. As can be seen from FIG. 12, the buckle 161b is L-shaped. Nevertheless, the position of the buckle 161b is interchangeable with the position of the notch 161a. That is, the buckle 161b may be disposed on the first frame, and the notch 161a may be disposed on the second frame.

After completion of the folding, the battery group 10 according to this application may be placed in a box body of the battery pack. To fix the battery group 10 in the box body, the battery frame 100 may be glued onto an inner wall of the box body, or, a hook portion (such as a lug) may be disposed on the battery frame 100, so that the battery frame 100 can be hooked onto the inner wall of the box body.

In this application, the battery frame 100 may be made of an insulation material to implement insulation between different battery modules 200 in the battery group 10, and insulation between the battery group 10 and the box body. This helps to reduce the quantity of insulating strips in the battery group 10, simplify the structure, and reduce costs.

In addition, the battery frame 100 may be made of a heat insulation material to reduce thermal diffusion of the battery 201.

Although this application has been described with reference to exemplary embodiments, various improvements may be made to the embodiments without departing from the scope of this application, and the parts therein may be replaced with equivalents. Particularly, to the extent that no structural conflict exists, various technical features mentioned in various embodiments can be combined in any manner. This application is not limited to the specific embodiments disclosed herein, but includes all technical solutions falling within the scope of the claims.

What is claimed is:

1. A battery frame, comprising at least two frames, wherein each frame comprises a pallet and side plates, the side plates are peripherally connected to the pallet and comprise a first side plate and a second side plate that are arranged oppositely along a first direction, the first direction is parallel to a plane in which the pallet is located, and the at least two frames are sequentially connected along the first direction; in the at least two frames, any two adjacent frames are rotatably connected to each other, so that the battery frame is in either an unfolded state or a folded state; when the battery frame is in the unfolded state, the at least two frames are disposed alongside in the first direction; when the battery frame is in the folded state, the at least two frames are stacked along a second direction; and the second direction is perpendicular to the plane in which the pallet is located;

wherein the battery frame comprises at least three frames; and, among any three adjacent frames, a middle frame is folded in an opposite direction against two frames located on two sides;

wherein among any three adjacent frames, the middle frame is rotatably connected to a frame on a first side of the middle frame through a first rotation structure, the middle frame is rotatably connected to a frame on a second side of the middle frame through a second rotation structure, and the first rotation structure and the second rotation structure are located at two ends of the middle frame along the second direction, so that when the battery frame is in the folded state, the middle frame is oriented in an opposite direction against the two frames located on two sides;

wherein a hollow-out portion is further disposed on the frame, and the hollow-out portion is configured to fit an electrical connecting plate of a battery group;

wherein the electrical connecting plate comprises a first bend portion and a second bend portion that are connected to each other, and, when the battery frame is in the folded state, the first bend portion and the second bend portion are at an acute angle to each other and are located in two adjacent frames respectively; and wherein the hollow-out portion comprises a first hollow-out portion and a second hollow-out portion, the first hollow-out portion is located on a side plate and penetrates the side plate along a thickness direction of the side plate, and the second hollow-out portion is located on the pallet and penetrates the pallet along a thickness direction of the pallet.

2. The battery frame according to claim 1, wherein the first rotation structure is located at an end of a side plate along the second direction, the end being away from the pallet; and the second rotation structure is located at an end of a side plate along the second direction, the end being close to the pallet.

3. The battery frame according to claim 1, wherein:

the first rotation structure comprises a first spindle, a first connecting slot and two first connecting holes; the first spindle is disposed on the second side plate of the frame on the first side; the first connecting slot and the two first connecting holes are all disposed on the first side plate of the middle frame; the two first connecting holes are located at two ends of the first side plate of the middle frame along a third direction; the first connecting slot is located between the two first connecting holes along the third direction; the third direction is perpendicular to the first direction and the second direction; and the first spindle is inserted into the first connecting slot and the two first connecting holes; and/or the second rotation structure comprises a second spindle, a second connecting slot and two second connecting holes; the second spindle is disposed on the second side plate of the middle frame; the second connecting slot and the two second connecting holes are all disposed on the first side plate of the frame on the second side; the two second connecting holes are located at two ends of the first side plate of the frame on the second side along the third direction; the second connecting slot is located between the two second connecting holes along the third direction; the third direction is perpendicular to the first direction and the second direction; and the second spindle is inserted into the second connecting slot and the two second connecting holes.

4. The battery frame according to claim 1, wherein a locking structure is disposed between any two adjacent frames, and the locking structure is configured to lock the two adjacent frames when the battery frame is in the folded state.

5. The battery frame according to claim 1, wherein, among the any three adjacent frames, the two frames located on the two sides of the middle frame are identical in structure.

6. The battery frame according to claim 1, wherein the frame is made of an insulation material; and/or the frame is made of a heat insulation material.

7. A battery group, comprising:
an electrical connecting plate;
a battery module containing a battery; and
the battery frame according to claim 1;

wherein:
the battery frame is in the folded state, the battery module is disposed in each frame of the battery frame, the electrical connecting plate is electrically connected to tabs of different batteries in the battery group; and the electrical connecting plate is located at the hollow-out portion of the battery frame.

8. The battery group according to claim 7, wherein a groove is disposed between the first bend portion and the second bend portion, and the groove fits a first spindle or a second spindle of the battery frame.

9. The battery group according to claim 7, wherein the tabs are located on a side of the battery along a third direction, and the third direction is perpendicular to the first direction and the second direction; or, the tabs are located on two sides of the battery along the first direction.

10. A battery pack, comprising:
a box body; and
the battery group according to claim 7, wherein the battery group is disposed in the box body.

11. A method for assembling the battery group according to claim 7, comprising:
placing the battery module containing the battery into each frame of the battery frame that is in the unfolded state;
electrically connecting the tabs of the different batteries by using the electrical connecting plate; and
rotating two adjacent frames oppositely so that the battery frame changes from the unfolded state into the folded state.

* * * * *